United States Patent [19]

Guyton et al.

[11] Patent Number: 5,273,237
[45] Date of Patent: Dec. 28, 1993

[54] FOREBODY NOZZLE FOR AIRCRAFT DIRECTIONAL CONTROL

[75] Inventors: Robert W. Guyton, Beavercreek; Jon A. Tinapple, Fairborn; Kenneth C. Cornelius, Centerville, all of Ohio

[73] Assignee: The United States of America as represented by the Secretary of the Air Force, Washington, D.C.

[21] Appl. No.: 970,747

[22] Filed: Nov. 2, 1992

[51] Int. Cl.$^5$ .......................... F41G 7/00; F42B 10/60
[52] U.S. Cl. ..................................... 244/52; 244/3.22; 244/23 D; 244/76 J
[58] Field of Search ................. 244/52, 3.22, 76 J, 244/12.5, 23 C, 23 D

[56] References Cited

U.S. PATENT DOCUMENTS

| | | | |
|---|---|---|---|
| 2,870,978 | 1/1959 | Griffith et al. | 244/52 |
| 3,113,520 | 12/1963 | Geissler et al. | 244/3.22 |
| 3,142,153 | 7/1964 | Hensley | 244/52 |
| 3,276,376 | 10/1966 | Cubbison et al. | 244/52 |
| 3,502,288 | 3/1970 | Pavlin et al. | 244/78 |
| 4,646,991 | 3/1987 | Kranz | 244/3.22 |
| 4,852,827 | 8/1989 | Kranz | 244/3.22 |
| 4,896,846 | 1/1990 | Strom | 244/75 R |
| 4,901,948 | 2/1990 | Panos | 244/52 |
| 5,004,184 | 4/1991 | Bernard | 244/3.22 |
| 5,080,301 | 1/1992 | Knoche | 244/3.22 |

OTHER PUBLICATIONS

"X-29 Forebody Jet Blowing", Guyton et al., AIAA 92-0017 (1992).
"An Experimental Study of Pneumatic Vortex Flow Control on High Angle of Attack Forebody Model", Cornelius et al., AIAA 92-0018 (1992).

Primary Examiner—Michael S. Huppert
Assistant Examiner—Virna Lissi Ansley
Attorney, Agent, or Firm—Bobby D. Scearce; Thomas L. Kundert

[57] ABSTRACT

A system for augmenting yaw control in an aircraft is described which comprises first and second thrust nozzles disposed on the upper surface of the aircraft forebody aft of the forebody nose apex a distance of about 0.5 times the forebody diameter at about 45° to either side of the symmetry plane of the forebody, each thrust nozzle oriented to direct a fluid jet at an angle of about 10° from the surface of the forebody and generally rearwardly toward the symmetry plane at about 60° ±10° to the symmetry plane, and a source of pressurized fluid operatively connected to the thrust nozzles for generating the jets.

10 Claims, 2 Drawing Sheets

5,273,237

FOREBODY NOZZLE FOR AIRCRAFT DIRECTIONAL CONTROL

RIGHTS OF THE GOVERNMENT

The invention described herein may be manufactured and used by or for the Government of the United States for all governmental purposes without the payment of any royalty.

BACKGROUND OF THE INVENTION

The present invention relates generally nozzles for directional control of aircraft, and more particularly to a uniquely configured nozzle requiring reduced mass flow for yaw control augmentation of an aircraft.

The maneuver envelope and agility of fighter aircraft are limited in part by undesirably limited yaw control as angle of attack increases. As angle of attack increases, power required to coordinate a velocity vector roll maneuver increases to levels higher than that which conventional rudders can provide. Consequently, up to 75% of maximum achievable roll rate may be lost in the maneuver envelope. Vertical tail structural fatigue is a significant problem in fighter aircraft maintenance and augmentation of aircraft yaw power with forebody thrust nozzles for directional control may allow downsizing vertical tail surfaces.

Conventional forebody nozzle structures are generally limited to simple circular exit geometry shape and to pointing directions tangentially aft or forward, and therefore have effectiveness too limited for practical aircraft installations. The required mass flows are too high, and the trending with angles of attack and sideslip is not well behaved. The applicable range of effectiveness is limited to post stall angles of attack.

The invention solves or substantially reduces in critical importance problems in prior art structures as just suggested by providing a forebody thrust nozzle structure for augmenting yaw control of an aircraft wherein a unique combination of nozzle structure and orientation provide increased aircraft directional control. The nozzles are preferably located about 0.5 forebody diameter aft of the nose apex, and about 45° on either side of the plane of symmetry on the top side of the forebody. The nozzles are sized according to the available air pressure and are directed toward the plane of symmetry at about 60°. The added directional control provided by the forebody nozzles increases agility and maneuverability of fighter aircraft in both the conventional combat envelope and the post stall envelope.

It is therefore a principal object of the invention to provide an improved forebody nozzle configuration for directional control of an aircraft.

It is a further object of the invention to provide a forebody nozzle for augmenting yaw control of an aircraft.

These and other objects of the invention will become apparent as a detailed description of representative embodiments proceeds.

SUMMARY OF THE INVENTION

In accordance with the foregoing principles and objects of the invention, a system for augmenting yaw control in an aircraft is described which comprises first and second thrust nozzles disposed on the upper surface of the aircraft forebody aft of the forebody nose apex a distance of about 0.5 times the forebody diameter at about 45° to either side of the symmetry plane of the forebody, each thrust nozzle oriented to direct a fluid jet at an angle of about 10° from the surface of the forebody and generally rearwardly toward the symmetry plane at about 60°±10° to the symmetry plane, and a source of pressurized fluid operatively connected to the thrust nozzles for generating the jets.

DESCRIPTION OF THE DRAWINGS

The invention will be more clearly understood from the following detailed description of representative embodiments thereof read in conjunction with the accompanying drawings wherein.

DETAILED DESCRIPTION

Theoretical considerations and an experimental study of the control of forebody vortex flow fields using forebody pneumatic jets are described in the article by Cornelius et al, entitled "An Experimental Study of Pneumatic Vortex Flow Control on High Angle of Attack Forebody Model", AIAA 92-0018 (January 1992), and background material and experimental test results on forebody vortex control provided by the invention are presented in the article by Guyton et al, entitled "X-29 Forebody Jet Blowing", AIAA 92-0017 (January 1992), the teachings of both articles being incorporated by reference herein.

Figure 1:
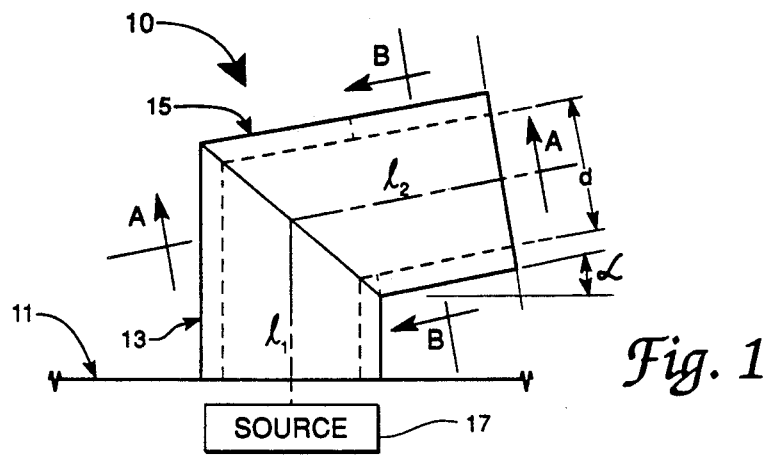
FIG. 1 is a schematic side view of the nozzle of the invention.
Figures 1A, 1B:
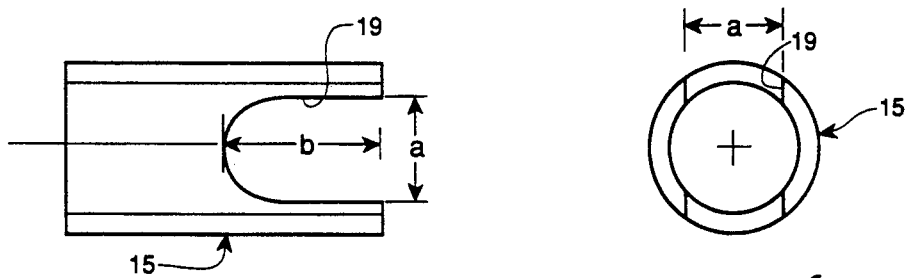
FIG. 1a is a view along line A—A of FIG. 1.
FIG. 1b is a view along line B—B of FIG. 1.

Referring now to the drawings, FIG. 1 is a schematic side view of thrust nozzle 10 of the invention as mounted on surface 11 of the forebody of an aircraft. FIG 1a is a view in axial section along A—A of FIG. 1, and FIG 1b is a view along line B—B of FIG. 1. Nozzle 10 structure and sizing according to the invention may best be described in terms of the inner diameter d thereof. Nozzle 10 may be fabricated from tube stock of internal diameter d selected from considerations of the mass flow requirements and pneumatic pressure supply of a particular system to which nozzle 10 is applied. Accordingly, nozzle 10 may comprise short upright tubing section 13 to which is joined at preselected angle a short section 15 of tubing, or, alternatively, sections 13,15 may be configured as a single angled tubing segment. Section 13 is chosen to have a centerline length $l_1$ of about 1.0 to 1.3 times d and preferably 1.1d, and section 15 is selected to have a centerline length $l_2$ of about 1.4 to 1.7 times d and preferably 1.5d. The invention works best with diametric slot 19 cut in the end of section 15, shown in FIGS. 1a,1b,1c in a plane substantially coincident with $l_1$ and $l_2$. Test data referenced herein shows that slot 19 effect is maximum when the width a is about 0.5 to 0.9 times d and preferably about 0.75d, and slot 19 length b is about 0.75 to 1.25 times d and preferably about 1.0d. Nozzle 10 may comprise substantially any material for the purpose intended as would occur to one skilled in the art, such as aluminum, steel, plastic, composite fiber/resin or ceramic, and may be joined to surface 11 by welding, threaded fitting or other suitable means. Section 15 is joined to section 13 by welding or other suitable means, at angle α to a perpendicular to section 13 (or to a tangent plane to surface 11) of about 0° to 20°, and preferably about 10° for optimum nozzle 10 performance. As suggested by test data presented or referenced herein, nozzle 10 inner diameter may be selected from a wide size range from about 0.25 to 1.2 inches, depending on the capacity of any available pressurized fluid source 17. Source 17 is operatively connected to nozzle 10 through a suitable opening in surface 11 and may comprise pressurized air from the engine compressor or other pressurized fluid such as nitrogen, carbon dioxide, helium or other inert gas, as would occur to the skilled artisan practicing the invention. The required nozzle 10 diameter generally varies inversely with source 17 pressure. Large (1.2 inch) diameter nozzles may operate at pressures available from the aircraft engine compressor core bleed; small (0.25 inch) nozzles may require an accumulator/storage system to augment engine bleed air pressure.

Figures 2, 2A:
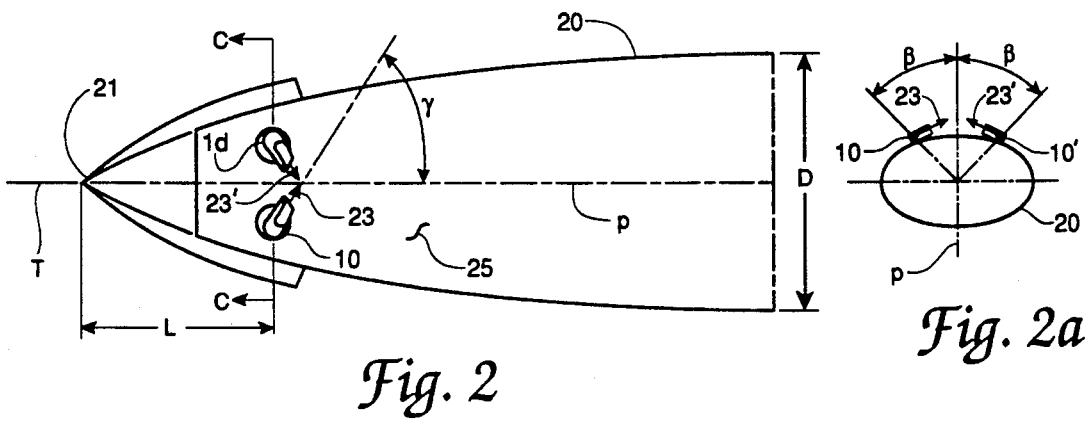
FIG. 2 is a top view of an aircraft forebody section showing placement thereon of two nozzles of FIG. 1.
FIG. 2a is a sectional view along line C—C of FIG. 2.

FIG. 2 shows schematically the placement and orientation of two nozzles 10,10' on surface 11 of aircraft forebody 20 defined along longitudinal axis T and with respect to symmetry plane p. FIG. 2a is a view in section of forebody 20 along line C—C of FIG. 2. In accordance with a governing principle of the invention, nozzles 10,10' are placed on surface 11 at a preselected distance L aft of forward nose apex 21 of forebody 20. The distance L is defined in terms of the maximum diameter D of forebody 20 from which forebody fineness ratio is determined. (Fineness ratio is defined as the distance along the longitudinal axis of the forebody from the nose tip to a point where the forebody reaches maximum breadth divided by the forebody maximum breadth.) L is preferably in the range of about 0.4 to 0.6 times D, and for optimum results in operation of contemporary fighter aircraft is about 0.5D, As shown most clearly in FIG. 2a, nozzles 10,10' are disposed on surface 11 at an angle β on either side of symmetry plane p of forebody 20, and in a posture by which jets 23,23' of fluid from source 17 are directed along and in closely spaced relationship to surface 25 of forebody 20 inwardly at an angle γ to plane p as suggested in FIG. 2. For optimum results, β is in the range of about 35° to 55° and preferably about 45°, and γ is in the range of about 50° to 70° and preferably about 60°. Performance of nozzles 10,10' was found to be substantially insensitive to small changes (±10°) in γ about the preferred 60° orientation, but at larger or smaller γ substantial effect on performance was noted in the test data.

Figure 3B:
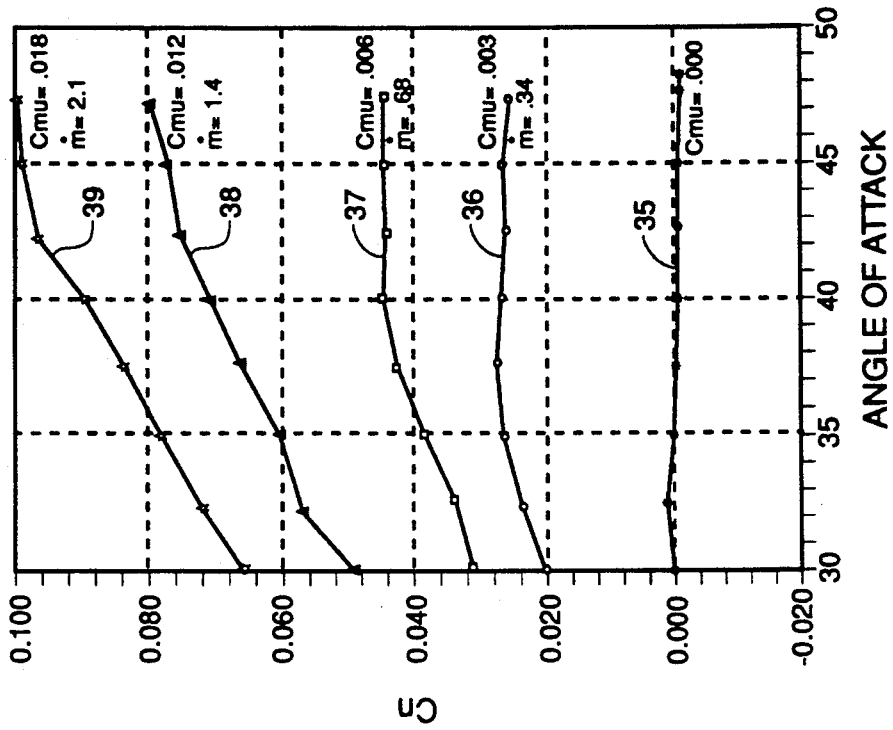
FIGS. 3a and 3b show comparative graphs of yaw moment $C_n$ versus angle of attack for various blowing rates, respectively, for an existing nozzle and the improved nozzle of FIG. 1.
Figure 3A:
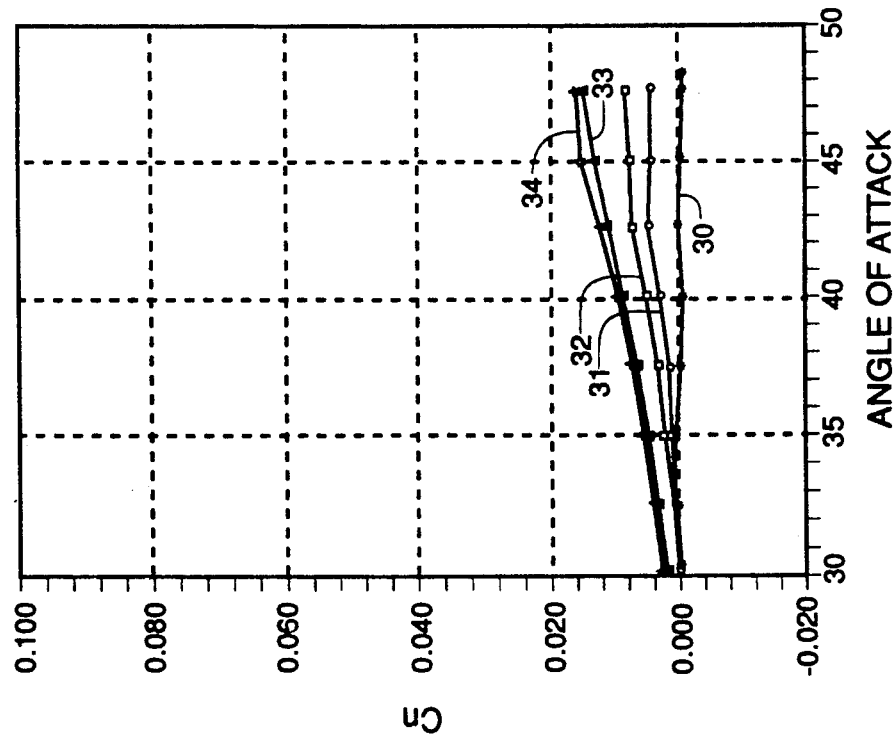

FIGS. 3a,3b show comparative graphs of yaw moment $C_n$ versus angle of attack for various blowing rates, comparing wind tunnel test results on a fighter aircraft with a conventional nozzle configuration (FIG. 3a) and improved nozzle 10 of the invention (FIG. 3b). In FIG. 3a, curves 30,31,32,33,34 define $C_n$ versus angle of attack for mass flow coefficient $C\mu$ of 0, 0.003, 0.006, 0.012 and 0.016, respectively, and corresponding blowing rates m of 0, 0.34, 0.68, 1.4 and 2.1 lbm/sec for modern fighter aircraft operating at subsonic speeds. In FIG. 3b corresponding curves 35,36,37,38,39 are given for nozzle 10 at the same respective $C\mu$ and m values. It is seen that an order of magnitude improvement in directional control effectiveness is provided by the invention.

The combination of nozzle pointing and nozzle slot produces a large difference in the mechanism by which directional control is achieved (see Guyton et al, supra, page 4 and FIG. 18). The exit flow from conventional circular nozzles pointed tangentially aft produces an axi-symmetric jet expansion down the side of the forebody. The flow from a nozzle of the invention attaches a thin sheet of air flow obliquely across the top of the forebody.

The invention therefore provides an improved forebody thrust nozzle structure for augmenting yaw directional control of an aircraft. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A system for augmenting yaw control in an aircraft having a forebody portion defined along a central longitudinal axis and plane of symmetry, said forebody portion having an upper surface and a forward end, the system comprising:
   (a) first and second thrust nozzles disposed on the upper surface of said forebody portion aft of the forward end of said forebody a distance equal to about 0.4 to 0.6 times the maximum breadth of said forebody portion and at a first angle of about 35° to 55° to opposite sides of the plane of symmetry of said forebody portion, each of said thrust nozzles fixed in orientation to direct a fluid jet along said upper surface at a second preselected fixed angle in the range of about 0° to 20° from said upper surface and generally rearwardly and toward said plane of symmetry at a third preselected fixed angle of about 50° to 70° with respect to said plane of symmetry; and
   (b) a source of pressurized fluid propellant operatively connected to each of said first and second thrust nozzles for electively discharging a fluid jet from said first and second thrust nozzles.

2. The system of claim 1 wherein said source of pressurized fluid propellant comprises a fluid selected from the group consisting of air, nitrogen, carbon dioxide and helium.

3. A system for augmenting yaw control in an aircraft having a forebody portion defined along a central longitudinal axis and plane of symmetry, said forebody portion having an upper surface and a forward end, the system comprising:
   (a) first and second thrust nozzles disposed on the upper surface of said forebody portion aft of the forward end of said forebody a distance equal to about 0.4 to 0.6 times the maximum breadth of said forebody portion and at a first angle of about 35° to 55° to opposite sides of the plane of symmetry of said forebody portion, each of said thrust nozzles oriented to direct in the range of about 0° to 20° from said upper surface and generally rearwardly and toward said plane of symmetry at a third preselected fixed angle of about 50° to 70° with respect to said plane of symmetry;
   (b) wherein each of said first and second thrust nozzles comprises a first short upright tubing segment having at a first end thereof an inlet operatively connected to said source and joined at preselected angle at the second end thereof to a second short tubing segment, each of said first and second segments having a preselected inner diameter in the range of about 0.25 inch to about 1.2 inches, said first segment having a centerline length of about 1.0 to 1.3 times said preselected inner diameter and said second segment having a centerline length of about 1.4 to 1.7 times said preselected inner diameter; and (c) a source of pressurized fluid propellant operatively connected to each of said first and second thrust nozzles for selectively discharging a fluid jet from said first and second thrust nozzles.

4. The system of claim 3 wherein said source of pressurized fluid propellant comprises a fluid selected from the group consisting of air, nitrogen, carbon dioxide and helium.

5. The system of claim 3 further comprising means defining a diametric slot in said second segment at the second end thereof, said slot being defined substantially in the plane containing the centerlines of said first and second segments and having width of about 0.5 to 0.9 times said preselected inner diameter and length of about 0.75 to 1.25 times said preselected inner diameter.

6. A system for augmenting yaw control in an aircraft having a forebody portion defined along a central longitudinal axis and plane of symmetry, comprising:

(a) first and second thrust nozzles each comprising a first short upright tubing segment having an inlet at a first end thereof and joined at preselected angle at the second end thereof to a second short tubing segment, each of said first and second segments having a preselected inner diameter in the range of about 0.25 inch to about 1.2 inches, said first segment having a centerline length of about 1.1 times said preselected inner diameter and said second segment having a centerline length of about 1.5 times said preselected inner diameter;

(b) said first and second thrust nozzles being disposed on the upper surface of said forebody portion aft of the forward end of said forebody a distance equal to about 0.5 times the maximum breadth of said forebody portion and at an angle of about 45° to opposite sides of the plane of symmetry of said forebody portion, each of said thrust nozzles oriented to direct a fluid jet along said upper surface at an angle of about 10° from said upper surface and generally rearwardly and at an angle of about 60° toward said plane of symmetry; and (c) a source of pressurized fluid propellant operatively connected to the inlet of each said first segment of said first and second thrust nozzles for selectively discharging a fluid jet from said first and second thrust nozzles.

7. The system of claim 6 wherein said source of pressurized fluid propellant comprises a fluid selected from the group consisting of air, nitrogen, carbon dioxide and helium.

8. The system of claim 6 further comprising means defining a diametric slot in said second segment at the second end thereof, said slot being defined substantially in the plane containing the centerlines of said first and second segments and having width of about 0.5 to 0.9 times said preselected inner diameter and length of about 0.75 to 1.25 times said preselected inner diameter.

9. A system for augmenting yaw control in an aircraft having a forebody portion defined along a central longitudinal axis and plane of symmetry, comprising:

(a) first and second thrust nozzles each comprising a first short upright tubing segment having an inlet at a first end thereof and joined at preselected angle at the second end thereof to a second short tubing segment, each of said first and second segments having a preselected inner diameter in the range of about 0.25 inch to about 1.2 inches, said first segment having a centerline length of about 1.0 to 1.3 times said preselected inner diameter and said second segment having a centerline length of about 1.4 to 1.7 times said preselected inner diameter;

(b) said first and second thrust nozzles being disposed on the upper surface of said forebody portion aft of the forward end of said forebody a distance equal to about 0.4 to 0.6 times the maximum breadth of said forebody portion and at an angle of about 35° to 55° to opposite sides of the plane of symmetry of said forebody portion, each of said thrust nozzles oriented to direct a fluid jet along said upper surface at an angle of about 0° to 20° from said upper surface and generally rearwardly and at an angle of about 50° to 70° toward said plane of symmetry;

(c) means defining a diametric slot in said second segment at the second end thereof, said slot being defined substantially in the plane containing the centerlines of said first and second segments and having width of about 0.5 to 0.9 times said preselected inner diameter and length of about 0.75 to 1.25 times said preselected inner diameter; and (d) a source of pressurized fluid propellant operatively connected to the inlet of each said first segment of said first and second thrust nozzles for selectively discharging a fluid jet from said first and second thrust nozzles.

10. The system of claim 9 wherein said source of pressurized fluid propellant comprises a fluid selected from the group consisting of air, nitrogen, carbon dioxide and helium.

* * * * *